United States Patent

Wrede et al.

[11] Patent Number: 5,951,970
[45] Date of Patent: Sep. 14, 1999

[54] DRYING COMPOSITION COMPRISING AN ODORIFEROUS SUBSTANCE

[75] Inventors: Wolfgang Wrede; Joachim Kochta, both of Holzminden, Germany

[73] Assignee: Haarmann & Reimer GmbH, Holzminden, Germany

[21] Appl. No.: 08/874,683

[22] Filed: Jun. 13, 1997

[51] Int. Cl.$^6$ .............. A61L 9/015; A61L 11/00; A01N 59/22; A01N 59/02

[52] U.S. Cl. .............. 424/76.2; 424/667; 424/709; 424/76.5; 523/102; 523/111

[58] Field of Search .............. 523/102, 111; 424/667, 709, 76.2, 76.5; 514/912; 512/25

[56] References Cited

U.S. PATENT DOCUMENTS

| | | | |
|---|---|---|---|
| 3,661,815 | 5/1972 | Smith | 260/17.4 |
| 4,076,663 | 2/1978 | Masuda et al. | 260/17.4 |
| 4,083,371 | 4/1978 | Beringer et al. | 131/2 |
| 4,683,258 | 7/1987 | Itoh et al. | 524/434 |
| 5,229,466 | 7/1993 | Brehm et al. | 525/329.9 |
| 5,280,079 | 1/1994 | Allen et al. | 525/329.9 |

FOREIGN PATENT DOCUMENTS

| | | | |
|---|---|---|---|
| 0450922 | 10/1991 | European Pat. Off. | |
| 52014689 | 7/1975 | Japan. | |
| 56-036554 | 4/1981 | Japan. | |
| 8234101 | 2/1982 | Japan. | |
| 61113900 | 11/1984 | Japan. | |
| 63-072339 | 4/1988 | Japan. | |
| 63-284124 | 11/1988 | Japan. | |
| 6165907 | 6/1994 | Japan. | |
| 407062398 | 3/1995 | Japan. | |
| 716882 | 10/1954 | United Kingdom | 81/1 |
| 1304086 | 1/1973 | United Kingdom | C08G 39/04 |
| 9317066 | 9/1993 | WIPO. | |
| 9425520 | 11/1994 | WIPO | C08L 1/28 |
| 9425521 | 11/1994 | WIPO | C08L 1/28 |

OTHER PUBLICATIONS

Römpp, (9), pp. 4743–4744, (1992).
Kirk–Othmer, (3), vol. 8, pp. 114–119, (1979).
Derwent Abstract of JP 58 138 461, (Aug. 17, 1983).
Patent Abstracts of Japan, Abstract of JP 06 165 907, (Jun. 14, 1994).
Patent Abstracts of Japan, Absract of JP 63 –72 339, (Apr. 2, 1988).
Patent Abstracts of Japan, Abstract of JP 06 319 990, ( Nov. 22, 1994).

*Primary Examiner*—Jose' G. Dees
*Assistant Examiner*—Alton Pryor
*Attorney, Agent, or Firm*—Sprung Kramer Schaefer & Briscoe

[57] ABSTRACT

The invention relates to a composition which donates an odoriferous substance and absorbs moisture, and can preferably be employed in wardrobes and similar containers, and in small rooms, for keeping the atmosphere dry.

4 Claims, No Drawings

DRYING COMPOSITION COMPRISING AN ODORIFEROUS SUBSTANCE

The invention relates to a fragrance-donating and moisture-absorbing composition based on
(A) a water-absorbing polymer,
(B) a porous carrier for C and
(C) an odoriferous substance.

Dampness in cellars and other rooms can lead to the formation of mold and to a musty odor. In tropical regions of high atmospheric humidity, however, it is also important to reduce this dampness in wardrobes and other containers in order to avoid the said formation of mold and odor.

Moisture-absorbing agents are known in principle and are also commercially obtainable. An overview of the known drying agents is to be found, for example, in Römpp (9), 4743 (1992) or in Kirk-Othmer (3) 8, 115 (1979). Other substances of this type are, for example calcium chloride, silica gel, sodium sulphate and sodium carbonate. Products available on the market are usually for use in cellars. For reasons of price, anhydrous calcium chloride, which has already been known for a long time as a drying agent, is used as the active material.

In practical applications, the use of calcium chloride leads to the initially solid drying agent becoming liquid by absorption of water. This initially starts with the formation of the hydrate of calcium chloride, which then absorbs further water and forms a saturated solution. A possibility of accommodating the liquid must therefore be provided.

Customary embodiments of such a product on the market therefore use a two-compartment container. The upper, open part, which serves to absorb the moisture, contains granular calcium chloride on a sieve-like base. The reservoir underneath the sieve-like base is initially empty and serves for later accommodation of the liquid. Because of the nature of the drying agent and the construction of the drying agent container, such embodiments are unsuitable for rooms in living areas and for use in cupboards.

The present invention was therefore based on the object of eliminating these deficiencies and of providing a product which can be used safely and completely without danger both in rooms which are lived in and in cupboards, preferably in wardrobes, but also in other containers. It should furthermore be possible to incorporate odoriferous substances without technical expenditure.

It has now been found that a system which comprises on the one hand at least one water-absorbing polymer and on the other hand an odoriferous substance on sodium sulphate meets these requirements surprisingly well.

The invention thus relates to a drying composition which comprises an odoriferous substance and is based on
(A) a water-absorbing polymer with a water vapour absorption capacity of at least 650, preferably 1,300 to 2,000 g/kg of A, determined over 30 days at 30° C. and 80% relative atmospheric humidity,
(B) anhydrous sodium sulphate and
(C) an odoriferous substance.

The water-absorbing polymers are known. They can be linear, but are preferably crosslinked. They are in general polymers of water-soluble ethylenically unsaturated compounds and polyethylenically unsaturated crosslinking agents. The ethylenically unsaturated monomers can be nonionic, anionic or cationic.

In the case of ionic monomers, mixtures of ionic and nonionic monomers can also be employed, the content of nonionic monomers as a rule being 0 to 90, preferably 0 to 70% by weight, based on the sum of starting compounds to be polymerized. Examples of nonionic monomers are vinylpyrrolidone, methacrylamide and—preferably—acrylamide. Examples of anionic monomers are sulphonic acid derivatives, such as allyl sulphonate and 2-acrylamido-2-methyl-propanesulphonate, and carboxylic acids and their derivatives, such as methacrylic acid, maleic acid, itaconic acid, crotonic acid and—preferably—acrylic acid. Examples of cationic monomers include dialkylaminoalkyl (meth) acrylates and dialkylaminoalkyl(meth)acrylamides, usually as an acid adduct or quaternary salt, such as, for example, dimethylaminomethyl (meth)acrylate and dimethylaminopropyl(meth)acrylamide.

Preferred polymers A include, for example, graft polymers of acrylonitrile or acrylic acid on hydrolysed starch (U.S. Pat. Nos. 3,661,815 and 4,076,663), hydrolysed vinyl acetate/acrylate copolymers (JP-A Sho 52-14 689), hydrolysed acrylonitrile or acrylamide copolymers (JP-A Sho 53-15 959) and crosslinking products thereof, partly neutralized, optionally crosslinked polyacrylic acid (JP-A Sho 57-34 101), water-swellable acids, such as polyacrylic acid, crosslinked by silicic acid or silicates (WO 93/17 066), internally esterified copolymers of unsaturated monomers containing carboxyl groups and unsaturated monomers containing hydroxyalkyl ester groups (U.S. Pat. No. 5,280,079), crosslinked polymers containing carboxyl groups, for example polyacrylic acid crosslinked with trimethylolpropane trisacrylate, if appropriate in the presence of a hydrophilic organic solvent, such as glycerol (EP-A 450 922), polymers containing carboxyl groups, which are neutralized to the extent of 50 to 99 mol %, additionally comprising, per 100 parts by weight of these polymers,
   a) 0.001 to 5 parts by weight of N-hydroxyalkyl-β-(meth) alanine esters and/ or
   b) 0.001 to 5 parts by weight of polycondensation products of a) in
   c) 0.1 to 5 parts by weight of water and
   d) 0.2 to 10 parts by weight of a water-miscible organic diluent (German Offenlegungsschrift 41 16 428),
compositions of 70 to 99.9% by weight of optionally crosslinked water-soluble and/or water-swellable polymers based on polysaccharides or derivatives thereof and 0.1 to 30% by weight of optionally crosslinked water-swellable synthetic polymers of (meth)acrylic acid, (meth) acrylonitrile, (meth)acrylamide, vinyl acetate, vinylpyrrolidone, vinylpyridine, maleic acid (anhydride), itaconic acid (anhydride), fumaric acid, vinylsulphonic acid, 2-acrylamido-2-methylpropanesulphonic acid and the amides, the N-alkyl derivatives, the N,N'-dialkyl derivatives, the hydroxyl group-containing esters and the amino group-containing esters of these polymerizable acids, preferably 2 to 98 mol % of the acid groups of these acids being neutralized, and 0.1 to 30% by weight, based on these polymeric components, of a material having a melting or softening point below 180° C., to prevent demixing and gel blocking, if appropriate 0.001 to 10% by weight, based on the polymeric components, of a crosslinking agent and if appropriate up to 50% by weight, based on the polymeric components, of an antiblocking agent based on fibers or materials of high surface area (German Offenlegungsschrift 42 06 856), and/or with 0.1 to 50% by weight, based on the polymeric components, of a reactive additive for improving the absorption capacity and rate of absorption of the polymeric composition (German Offenlegungsschrift 42 06 857).

If polymers A contain free or (partly) neutralized acid groups, the preferred content is at least 0.2 equivalent of free and/or neutralized acid groups per 100 g of polymer A.

Polymers A in general have molecular weights, determined as the number-average, of 3,000 to 1,000,000, preferably 10,000 to 500,000.

Polymers A have to date chiefly been employed for absorbing water in nappies and articles of female hygiene. Surprisingly, it has been found that these polymers, which are not actually intended at all for absorption of water vapour, have advantages over inorganic substances such as concentrated sulphuric acid, phosphorus pentoxide or calcium chloride. Thus, they show an outstanding linear absorption of atmospheric humidity which reaches a multiple of the absorption of inorganic substances. These absorbers are safe in all respects; even if the fragrancing and drying composition according to the invention is not used properly, they cause no problems at all. However, one disadvantage of these absorbers is their sensitivity to further additives, which can significantly modify the operation of absorption of moisture. For example, fragrances sprayed on would undesirably reduce or even prevent absorption of moisture.

Since the drying compositions according to the invention are also to contain fragrances, a way had to be found of incorporating an adequate amount of fragrances. In particular a carrier which was able to absorb the fragrances without reducing the absorption of water by the polymeric absorbers was to be found. Furthermore, it was desirable to apply the fragrances by simple mixing, without a spraying technique.

It has been found that inorganic carriers fulfil this function best. The preferred carrier B is sodium sulphate.

The preferred carrier B is spray-dried sodium sulphate. As a result of the spraying process, in addition to small spherical hollow bodies, microcrystalline structures which can absorb significant amounts of organic liquid, such as, for example, odoriferous substances, are formed. The bulk density of such a sodium sulphate is usually about 450 g/l; the particle diameter can be between 0.05 mm and 0.5 mm, but in general is chiefly in the region of about 0.25 mm. This sodium sulphate can absorb about 15% by weight of perfume without sticking together; on the other hand, it contributes towards absorption of water, since it contains no or only very little water of crystallization after the spray drying. In the course of absorption of moisture, the structure of the sodium sulphate is modified by water of crystallization, and as a result last residues of odoriferous substances are also released in a humidity-controlled period.

Assuming a duration of use of about 3 months, according to existing findings about 5 to 10 mg of odoriferous substances per day will evaporate, and consequently a total of 0.5 to 1.0 g of odoriferous substances would have to be applied.

The odoriferous substances can be traditional in nature, but also comprise odoriferous substances having a repellant action to insects, for example lavender. In addition, the drying compositions according to the invention can also comprise insecticides, such as, for example permethrin.

The compositions according to the invention comprise component A in amounts of 1 to 99, preferably 40 to 90 parts by weight, component B in amounts of 1 to 60, preferably 30 to 50 parts by weight and component C in amounts of 0.5 to 5, preferably 0.5 to 2 parts by weight.

A suitable embodiment could have the following composition:

(1) 90% of absorber

9% of sodium sulphate

1% of odoriferous substances

A less expensive embodiment had the following composition (2) 50% of absorber

49% of sodium sulphate

1% of odoriferous substances

The free-flowing powder is prepared by prior mixing of the fragrances with the sulphate, which in turn was admixed to the absorber in a simple mixer.

An expansion in volume occurs as a result of the absorption of moisture. The container for the recipe according to the invention must therefore have dimensions such that the expanded volume can be accommodated. This can be achieved by only partly filling the envisaged container with the composition according to the invention, or by constructing the walls of the container sufficiently flexibly, for example by means of elastic, perforated film.

EXAMPLES

For testing the water-absorbing properties, in each case 30 g of the moisture-absorbing substances, called absorbers below, were stored over an adequate amount of water at room temperature in a closed chamber such as is usually used for thin layer chromatography. The absorption of water, measured as the weight increase, was initially determined daily and later weekly. The particular absorbers used were dried uniformly to constant weight before the start of the test.

Comparison/Example

| | Absorption of water in [g] | | | | |
|---|---|---|---|---|---|
| | after 1 | 3 | 10 | 30 | 45 days |
| Calcium chloride | 7 | 20 | 35 | 35 | 35 |
| Sodium carbonate | 1 | 3 | 7 | 10 | 10 |
| Polymer absorber | 1 | 5 | 16 | 35 | 43 |
| System according to the invention* | 4 | 10 | 25 | 47 | 56 |

50% by weight of polymer absorber, ® SALSORB CL 10 or Product T 5319/99* from Chem. Fabrik Stockhausen, Krefeld, crosslinked polyacrylic acid in the Na form from Allied Colloids GmbH, Hamburg, 49% by weight of spray-dried sodium sulphate and 1% by weight of odoriferous substance These data demonstrate the surprising properties of a preparation according to the invention compared with the abovementioned salts. The absorption of moisture is without doubt slower, but continuous over a longer period of time and significantly higher.

We claim:

1. Drying composition consisting essentially of
   (A) 40 to 90% by weight of a water-absorbing polymer with a water vapor absorption capacity of at least 650 g/kg of A, determined over 30 days at 30° C. and 80% relative atmospheric humidity,
   (B) 30 to 50% by weight of spray-dried sodium sulphate and
   (C) 0.5 to 2% by weight of an odoriferous substance.

2. Drying composition according to claim 1, in which component B is the carrier for component C.

3. A method for reducing the atmospheric humidity in a human habitat, which comprises placing in said habitat a water-absorbing composition according to claim 1.

4. The method of claim 3 wherein component B is a carrier for component C.

* * * * *